Figure 1:
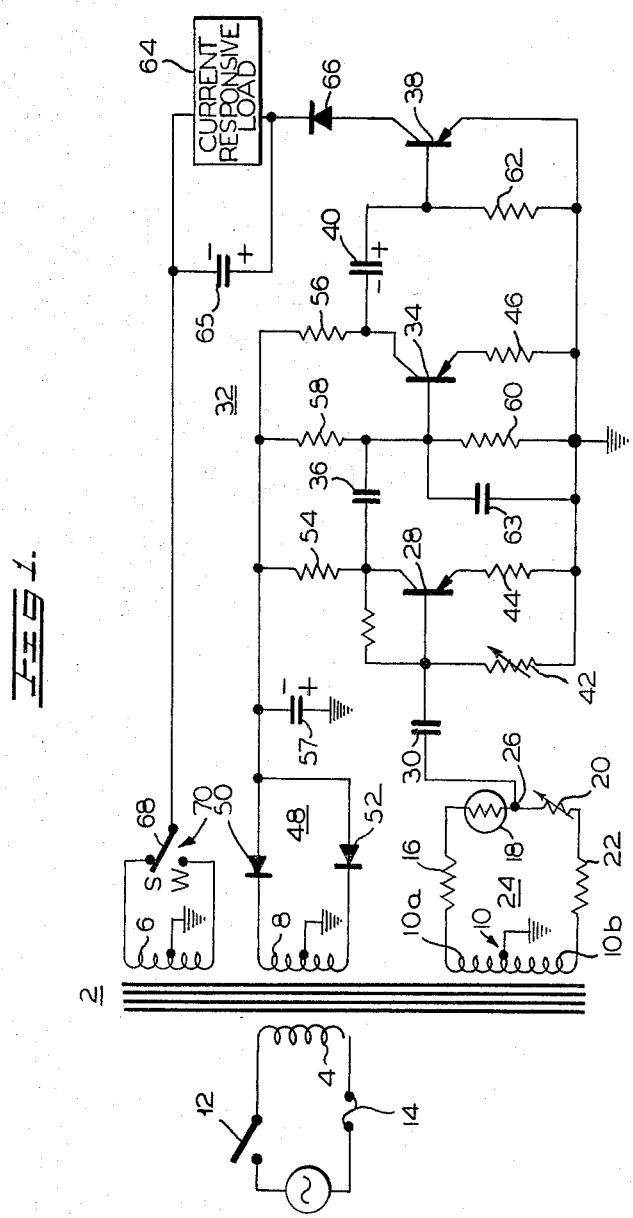

INVENTOR
BILLY BURLEY
BY Scrivener & Parker
ATTORNEYS

United States Patent Office 3,281,653
Patented Oct. 25, 1966

3,281,653
ELECTRONIC SYSTEM AFFORDING REVERSIBLE MODULATING CONTROL
Billy Burley, Dallas, Tex., assignor, by mesne assignments, to Johnson Service Company, Milwaukee, Wis., a corporation of Wisconsin
Filed June 29, 1962, Ser. No. 206,343
4 Claims. (Cl. 323—37)

This invention relates generally to an electronic system affording reversible modulating control over a controlled device, and more particularly to a condition-responsive electronic control system provided with selectively operable changeover means causing the system to be responsive, alternately, to opposite senses of deviation of a variable condition from a predetermined value.

It is conventional in the electronic controls art to utilize balanced bridge networks for operating a controlled device in accordance with deviations of a physical condition—such as temperature, pressure, humidity, conductivity, magnetic field or the like—from a predetermined value. The bridge networks may be of the balanced resistance, capacitance, inductance or impedance type depending on the condition to be measured. In modulating control systems, the controlled device is operated as a function of the degree of deviation of the condition from a predetermined value (i.e., in accordance with the extent of unbalance of the bridge). With proper calibration of the system, "linear" or "proportional" response of the controlled device to condition deviations may be readily obtained.

In certain condition-responsive control systems including a balanced bridge network and a controlled device operable in accordance with the bridge unbalance, it is often desirable to reverse the direction of control of the bridge over the controlled device so that the device is always operated in the same sense for deviations of a sensed condition in selective, alternative, opposite senses from a predetermined value. For example, in a "two-pipe" heating and air conditioning system of the type including a balanced-bridge controlled modulating valve for regulating the flow of heated fluid through a conduit during the winter months and cooling fluid during the summer months, it is desirable to provide seasonal changeover means causing the condition-responsive bridge network to operate the valve alternately in one direction for deviations in temperature in one sense from a predetermined value, and in the same direction for deviations in temperature in the opposite sense from said predetermined value. In the past, both mechanical means for reversing valve actuation and complex electrical switching means for reversing the electrical control have been proposed to obtain winter-summer changeover. The known systems have certain inherent drawbacks, such as complexity and high manufacturing cost, unreliable operation, and requirement of frequent maintenance and service. Furthermore, in the prior art it has been difficult to achieve a reversible control of the regulating valve that is linearly or proportionally responsive to changes in temperature deviation in opposite senses. The present invention was developed to avoid these and other drawbacks of the prior art.

The object of the present invention is to provide an electronic control having condition-responsive means producing a signal voltage having one of two opposite senses in accordance with the sense of deviation of the condition from a predetermined value, output means selectively responsive, alternately, to either of the two senses of signal voltage, and changeover means controlling the state of response of said output means.

A more specific object of the invention is to provide an electronic system for operating a control element in modulating response to variations in a physical condition from a predetermined value and including balanced-bridge condition-responsive means for producing signal voltages of magnitudes corresponding with the degree of condition deviation and of opposite phases when the measured condition deviates in opposite senses from a predetermined value, phase comparison means selectively responsive, alternately, to signal voltages of one of the two phases, and changeover means controlling the state of response of said changeover means.

Another object of the present invention is to provide an electronic control system including phase comparison means controlling the state of actuation of said system in accordance with the phase relationship between a reference voltage and a signal voltage developed by a given unbalance of a condition-responsive balanced bridge, said system being characterized by the provision of changeover means for reversing the responsiveness of said phase comparison means and consequently the state of actuation of said control for said given unbalance.

Still another object of the invention is to provide an electronic system affording modulating control and including a balanced bridge network of the resistive, capacitive, inductive or impedance type operable to produce a signal voltage of a phase and magnitude corresponding with the sense and magnitude of deviation, respectively, of a physical condition (such as temperature, humidity, pressure, or the like) from a predetermined value, selectively operable phase discriminating means controlling the state of activation of said system in accordance with the phase relationship of said signal voltage with respect to a reference voltage, changeover means for reversing the phase of said reference voltage, and controlled means connected with said phase discriminating means for controlling the physical condition as a function of the magnitude of the signal voltage.

The reversible electronic modulating control of the present invention is particularly suitable for use in a heating and air conditioning system having an electrically actuated temperature modifying device which is always operable in the same sense. In one operational embodiment of the invention, an electrical load controlling the operation of the temperature modifying device is connected with the output of a phase discriminator which compares a reference voltage with a signal voltage developed by a temperature-responsive bridge network. The signal voltage has a phase and magnitude of a given temperature deviation from a predetermined set value. Seasonal changeover means are provided for reversing the phase of the reference voltage to determine the state of actuation of the control. Consequently, when the controlled device is a throttling valve normally spring-biased to a fully open condition, for winter operation it is desirable to have the electronic control in activated and deactivated states when room temperature is above and below set temperature, respectively. This is accomplished by establishing the appropriate phase relationship between signal and reference voltages. For summer operation, it is desirable to have the electronic control in deactivated and activated conditions when room temperature is above and below set temperature, respectively. This is achieved by simple changeover of the instantaneous phase relationship of the reference voltage (more particularly, by switching a connection between opposite ends of a grounded center-tapped reference winding). Consequently, by the use of the novel changeover means of the present invention, the sense of control of a temperature responsive bridge network over a throttling valve continuously operable in a given sense is readily reversed in an extremely simple manner.

Figure 2:
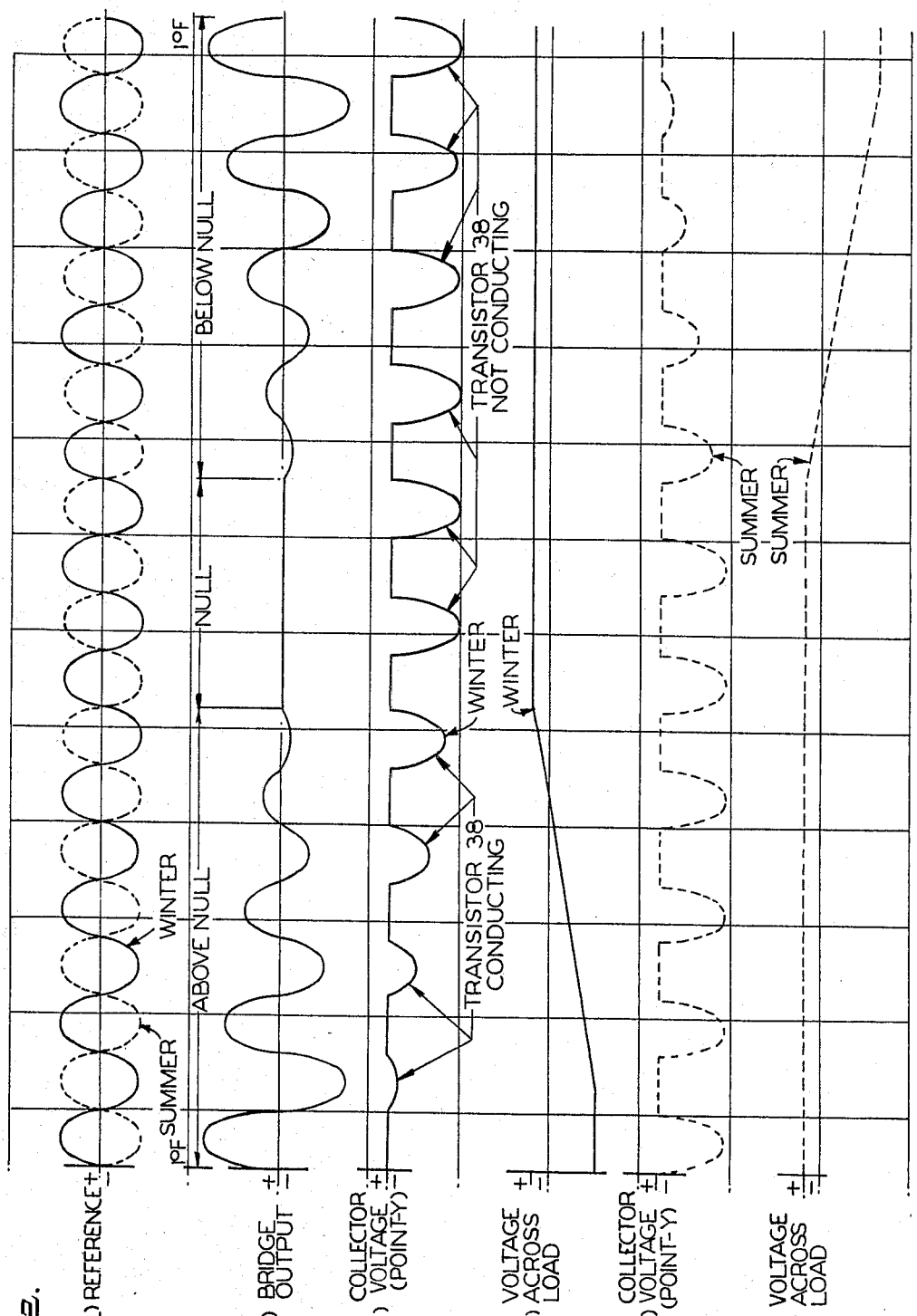

Other objects and advantages of the invention will become apparent from a study of the following specification when considered in conjunction with the accompanying drawing, in which:

FIG. 1 is a schematic circuit diagram of an electronic control system operable in accordance with the present invention to afford reversible modulating control over a current-responsive load device;

FIGS. 2(a) through 2(d) are waveform diagrams illustrating reference, bridge output, collector electrode and load voltages, respectively, for the circuit of FIG. 1 when the control is utilized in a heating and air conditioning system and the seasonal switch is in the winter position and the reference voltage has the phase relationship shown in solid line in FIG. 2(a); and FIGS. 2(e) and 2(f) are corresponding collector electrode and load voltage waveform diagrams when the seasonal switch is in the summer position and the reference voltage has the phase relationship shown in phantom in FIG. 2(a).

Referring to FIG. 1, transformer 2 is provided with a primary winding 4, and three secondary windings 6, 8 and 10 each having grounded center taps. Power is supplied to primary winding 4 via a supply circuit including an alternating current source, switch 12 and fuse 14. Secondary winding 10 is connected in series with fixed resistor 16, thermistor 18, variable resistance 20 and fixed resistor 22 to define temperature-responsive balanced bridge circuit 24. Bridge terminal 26 intermediate thermistor 18 and variable resistance 20 is connected with the base electrode of transistor 28 via condenser 30. Transistor 28, which forms the first stage of amplifier 32, includes a collector electrode connected with the base electrode of transistor 34 via condenser 36. The collector electrode of transistor 34 is connected with the base electrode of transistor 38 via condenser 40. Variable resistance 42 affords means for adjusting the potential of the base electrode of transistor 28, and grounding resistors 44 and 46 determine the potentials of the emitter electrodes of transistors 28 and 34, respectively. Full-wave rectifier circuit 48, that includes secondary winding 8 and diodes 50 and 52 connected in series opposition, applies biasing potentials to the collector electrodes of transistors 28 and 34 via collector resistors 54 and 56, respectively. Condenser 57 serves to smooth out the rectified biasing voltage. A voltage divider circuit including resistors 58 and 60 determines the base electrode potential of transistor 34, and resistor 62 determines the base potential of grounded-emitter transistor 38. Phase compensating condenser 63 connected in parallel with resistor 60 causes the amplified signal applied to the base electrode of transistor 38 to be in phase with the bridge unbalance signal produced at junction 26. Transistors 28, 34 and 38 have been illustrated as being of the p-n-p type, although it is apparent that by appropriate modification of the circuit, use could be made of transistors of the n-p-n type.

The collector electrode of transistor 38 is connected to one terminal of current-responsive load 64 via diode rectifier 66. The other load terminal is connected with the movable contact 68 of double-throw seasonal switch 70 the stationary contacts S and W of which are connected with opposite ends of secondary winding 6. Smoothing condenser 65 is connected in parallel with load 64. Load 64 may be the heating resistance of an expansible fluid actuator, the winding of a solenoid actuator, a relay winding, a current-responsive staging network, or the like.

OPERATION

1.—Heating and air conditioning control—summer

Assume that current-responsive load 64 is an electrically-controlled modulating valve that is spring-biased to a fully open condition and is connected in a conduit supplying cooling water to a room the temperature of which is to be regulated. (As an alternative, the load could be an electrically controlled damper in a conduit supplying cool air to the room.) Assume further that movable contact 68 of seasonal switch 70 is in the illustrated summer position, that variable resistance 20 is adjusted to establish a balanced bridge condition when thermistor 18 senses a room temperature of 75° F., that the setting of variable resistance 42 establishes a temperature response range of 1 degree on either side of set temperature, that transistor 28 is biased to Class A operation, and that transistor 38 is biased to cut-off.

If room temperature should equal set temperature when power switch 12 is closed to energize secondary windings 6, 8 and 10, bridge 24 is balanced, transistor 38 is nonconductive, load 64 is deenergized, and the modulating valve is spring-biased to the fully open position to maintain maximum supply of cooling fluid through the conduit.

Assuming now that room temperature should exceed set temperature, bridge 24 becomes unbalanced and a signal voltage is developed at junction 26 that has a given instantaneous phase relationship and a magnitude that is a function of the deviation of temperature from set temperature. The signal voltage is amplified by amplifier 32 which is shown as a conventional two-stage transistor amplifier including transistors 28 and 34 connected to rectifier 48 as a D.C. bias supply. The transistors 28 and 34 are shown as common emitter transistors of the PNP variety interconnected between the positive and ground side of the power supply in accordance with well known circuit connections. The amplifier 32 is an alternating current amplifier producing an amplified alternating current signal which is applied through the condenser 40 to the base electrode of transistor 38. With seasonal switch 70 in the summer position, the phase relationship between the signal voltage applied to the base of transistor 38 and the negative half cycles of reference voltage applied to the collector electrode of transistor 38 via diode 66 is such as to cause the transistor to be nonconductive, whereupon the electronic control is deactivated, load 64 is deenergized, and the modulating valve is spring-biased to the fully-open condition. It is apparent that with switch 70 in the summer position, the electronic control is deactivated for all values of room temperature equal to and above set temperature.

If, at the time of closing of switch 12, room temperature equals 74°, bridge 24 is unbalanced in the opposite sense to produce a signal voltage having a magnitude that is proportional with the extent of the 1° deviation between set temperature and room temperature. The signal voltage applied to the base electrode of transistor 38 has such a phase relationship relative to the negative half cycles of reference voltage applied to the collector electrode via diode 66 that transistor 38 becomes conductive, whereupon secondary winding 6 is connected with ground via load 64, diode 66 and the emitter to collector circuit of transistor 38. The level of the effective D.-C. current flowing in this load circuit is regulated by the effective impedance of transistor 38, which impedance is a function of the magnitude of the amplified signal voltage. Thus the current flowing through load 64 is a function of the 1° deviation in temperature from set temperature. Since the calibration of the system affords a 1° response range, the regulating valve controlled by load 64 is moved to a substantially closed throttling position to reduce the flow of cooling medium to the demand. This decrease in the flow of the cooling medium results in an increase in room temperature, whereby the temperature deviation sensed by the bridge is reduced, the signal voltage decreases, the impedance of transistor 38 increases, and the level of current flowing through the load decreases, whereupon the spring-biased valve moves toward its fully-open position. In accordance with the calibration of the system, this modulating action of the valve continues until a balanced condition between the heat transfer medium and space (room) temperature is reached, whereupon the valve has a throttling position meeting the space load requirements and maintaining the space at the desired temperature.

It is apparent that when the seasonal switch is in the summer position, modulation control over the valve is obtained only when room temperature is less than set temperature. The degree of closing of the modulating valve is a function of the magnitude of temperature. FIGS. 2(b), 2(e) and 2(f) illustrate the waveforms of the bridge output, collector electrode (transistor 38) and load voltages, respectively, for 1° deviations in room temperature above and below set temperature when the seasonal switch is in the summer position to establish the reference voltage illustrated in phantom in FIG. 2(a).

2.—Winter

Assume now that heated fluid is conducted through the conduit containing the modulating valve and that seasonal switch 70 is in the winter position to establish the reference voltage illustrated by the solid line in FIG. 2(a).

When room temperature equals set temperature, bridge 24 is balanced, transistor 38 is nonconductive, load 64 is deenergized, and the modulating valve is spring-biased to the fully open condition.

If room temperature should be below set temperature, the phase relationship between the amplified signal voltage applied to the base electrode of transistor 38 and the negative half cycles of reference voltage applied to the collector electrode is such as to cause transistor 38 to be nonconductive, the electronic control to be deactivated, load 64 to be deenergized, and the modulating valve to be fully open.

If room temperature should exceed set temperature, the signal voltage has a phase relationship relative to the reference voltage which causes conduction of transistor 38. Since the magnitude of the signal voltage is a function of the extent of temperature deviation, modulation control of the valve is obtained as described above, the degree of closing of the valve being a function of the magnitude of temperature deviation. As room temperature progressively decreases, the signal voltage and load current progressively decrease, and the modulating valve is progressively moved toward its fully-open position. After a period of time, the valve will have assumed a throttling position causing balance between the temperature-modifying medium and space (room) temperature in accordance with the space load demand. FIGS. 2(a) through 2(d) illustrate the voltage waveforms for deviations in room temperature below and above set temperature with the seasonal switch in the winter position.

Since the magnitude of the unbalanced bridge signal voltage is a function of the extent by which the measured condition deviates from a predetermined value, it is apparent that, by the use of a suitable load 64 (such as a resistance-heated expansible fluid or hydraulic actuator) proportional response actuation of the mechanically controlled device—together with the selective phase reversing changeover operation described above—may be readily achieved. While the changeover electronic control has been illustrated and described with specific reference to a heating and air conditioning system, the inventive concepts are, of course, applicable to many other electronic control systems of the phase sensitive type using balanced bridge networks or other similar means (for example, differential transformer means) which produce signals of opposite phases for deviations in a condition in opposite senses from a predetermined value. By appropriate adjustment of resistances 20 and 42 and selective setting of the seasonal switch, the sensitivity, operating range and sense of response may be varied as desired for particular applications. Furthermore, it is apparent that the invention is not to be construed as being limited to the specific type of amplifier and phase discriminator described and illustrated in the foregoing specification and accompanying drawing. Modifications obvious to those skilled in the art may be made without deviating from the invention set forth in the following claims.

What is claimed is:

1. In an electronic control system for controlling a condition, comprising
    condition-responsive means having condition sensing means and an output means establishing an electrical control signal having a magnitude that is a function of the deviation of the condition from a predetermined value, said means generating the signal with one phase in response to deviation in one direction and with an opposite phase in response to deviation in an opposite direction,
    output circuit means including a load means and a phase sensitive power controlling device, said device having an input means connected to said output means,
    an alternating current source, and
    a switch means connected in circuit with the alternating current source and the power controlling device and having a first position and a second position, said switch means in said first position connecting the alternating current power source across the device in phase with the electrical control signal in response to deviation in a first direction and out of phase with the electrical control signal in response to deviation in the opposite direction, and in said second position establishing the alternating current power across the device out of phase with the electrical control signal in response to deviation in said first direction and in phase with the electrical control signal in response to deviation in the opposite direction.

2. In the electronic control system of claim 1 wherein said phase sensitive power controlling device includes a transistor having a pair of load terminal means connected in series with the load means and an input terminal means connected to the output means of the condition responsive means.

3. In the electronic control system of claim 1 wherein the alternating current source includes a transformer having a center tapped secondary winding and said switch means is connected to the one side of the center tap in the first position and to the opposite side of the center tap in the second position, said switch and said center tap being connected across the output circuit means to establish alternating current energization across the output circuit means.

4. The electronic control system of claim 1 wherein said condition responsive means includes an alternating current bridge circuit having an alternating current input means and having the condition sensing means in one leg thereof, said phase sensitive power controlling device includes a diode in series with a transistor, said transistor having a pair of load terminals connected in series with the diode and the load means and having an input terminal, an amplifying means interconnecting the output of the bridge circuit to the input terminal of the transistor to bias the transistor in accordance with the electrical control signal, said alternating current source having an input means in common with the bridge circuit and including a center tapped transformer winding, and said switch means including a movable contact connected to one end of the output circuit means and having contacts connected to the opposite ends of the center tapped winding whereby said switch connects only one end of said center tapped winding to the output circuit means at any one time, the center tap being connected to the opposite end of the output circuit means whereby an alternating current is applied across the output circuit means, the phase of the alternating current signal being reversed by reversing of the position of the switch means between the first and second positions.

References Cited by the Examiner
UNITED STATES PATENTS

| | | | |
|---|---|---|---|
| 2,585,005 | 2/1952 | Godshalk | 323—75 X |
| 2,907,932 | 10/1959 | Patchell | 317—148.5 |
| 2,917,702 | 12/1959 | Steghart | 323—69 |

JOHN F. COUCH, *Primary Examiner.*

LLOYD McCOLLUM, *Examiner.*

K. HADLAND, K. D. MOORE, *Assistant Examiners.*